H. HEABERLIN.
Horse Rake.
No. 15,653.
3 Sheets—Sheet 1.
Patented Sept. 2, 1856.
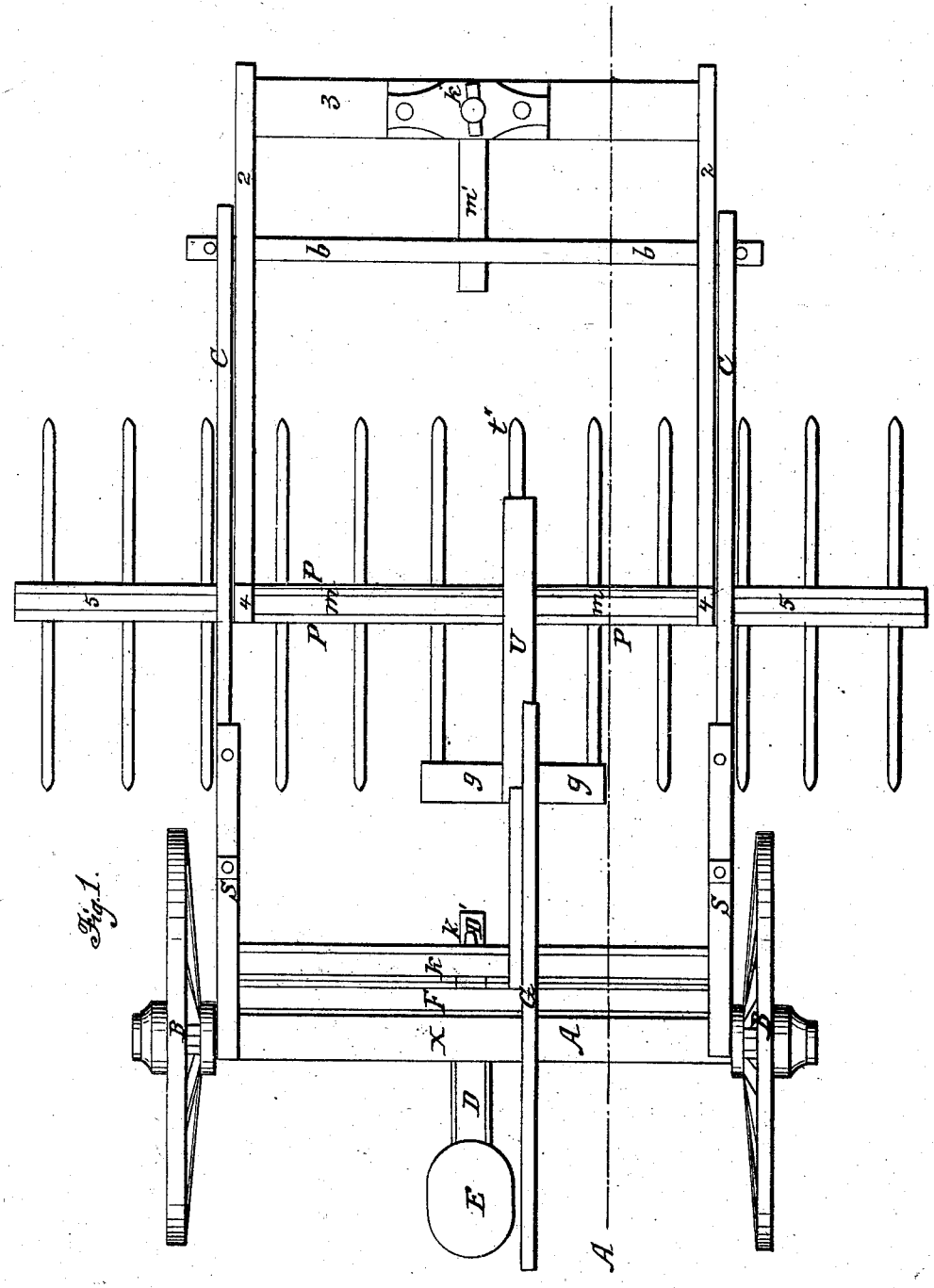

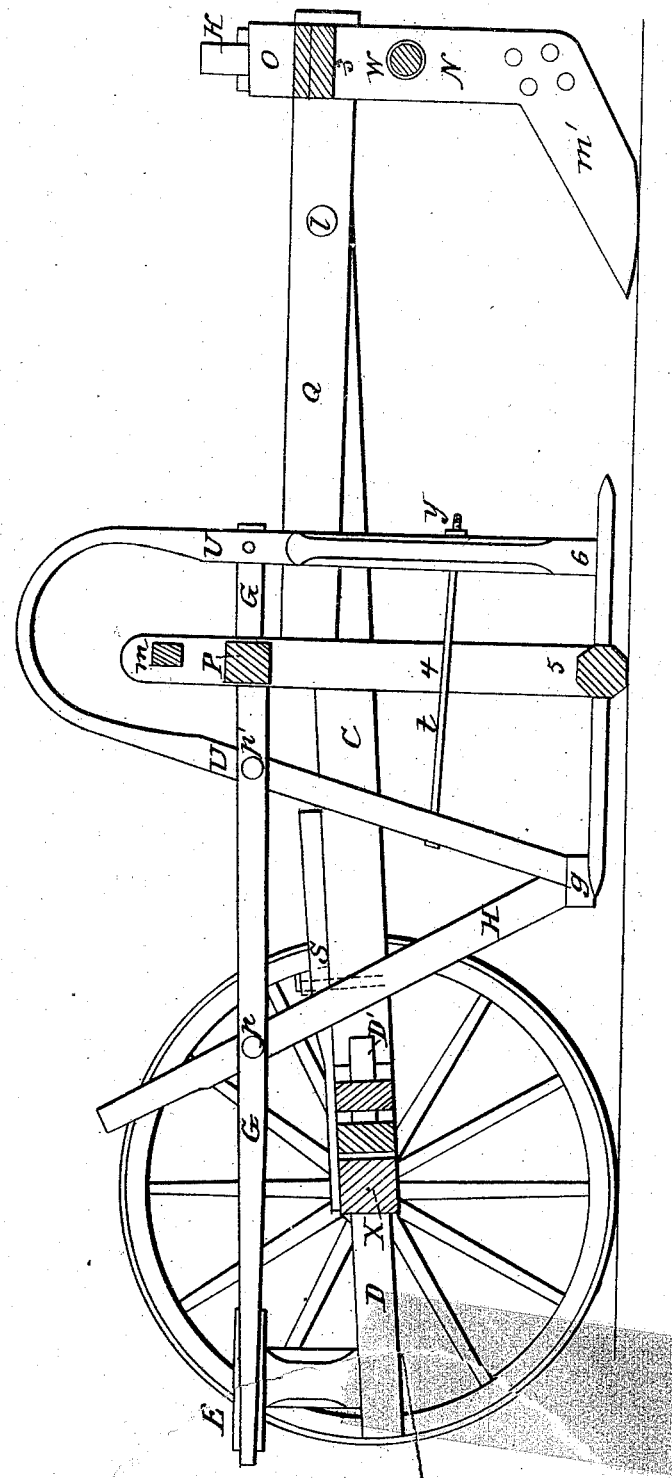

H. HEABERLIN.
Horse Rake.
No. 15,653.
3 Sheets—Sheet 3.
Patented Sept. 2, 1856.
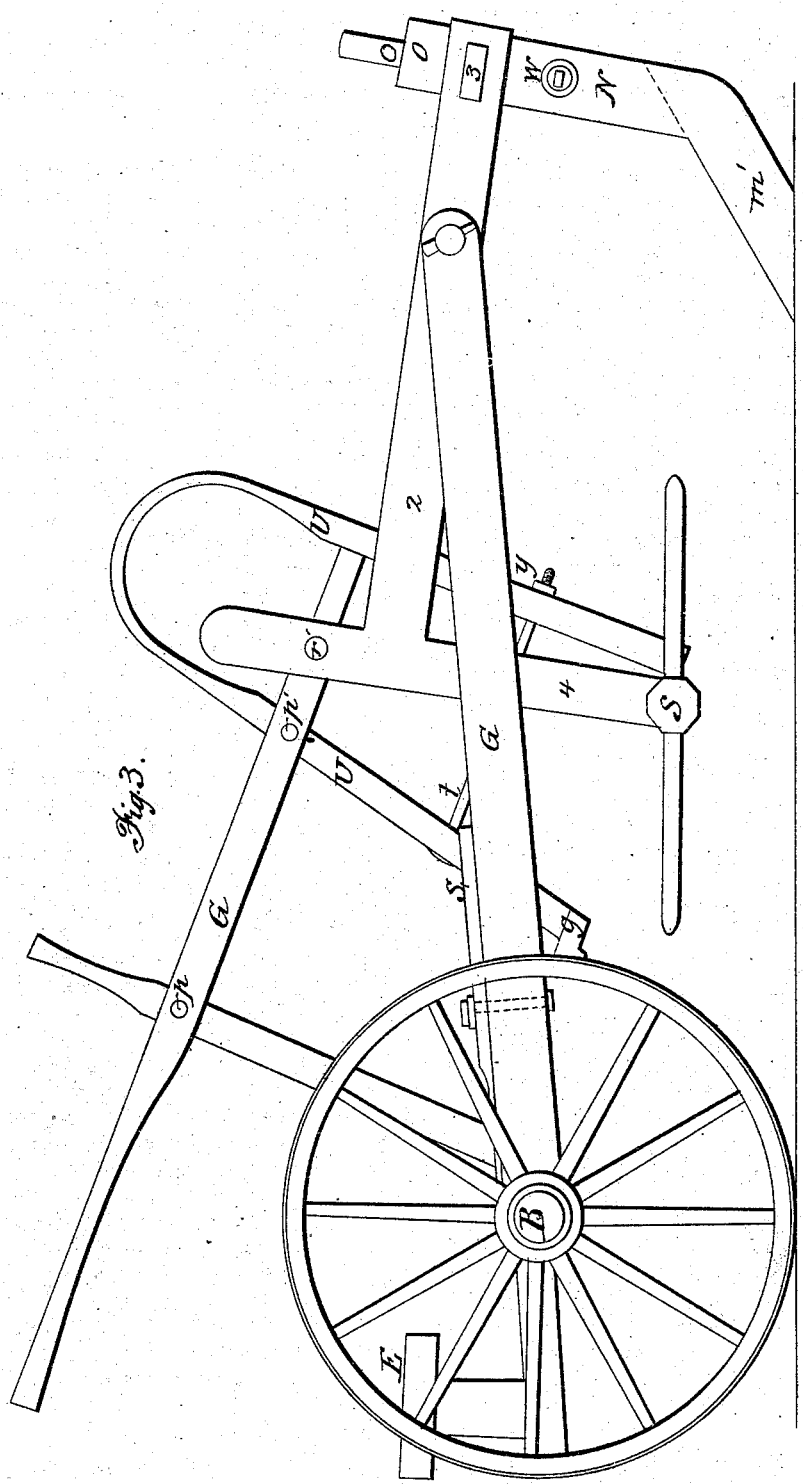

UNITED STATES PATENT OFFICE.

H. HEABERLIN, OF CLINTON COUNTY, ILLINOIS.

IMPROVEMENT IN HAY-RAKES.

Specification forming part of Letters Patent No. 15,653, dated September 2, 1856.

*To all whom it may concern:*

Be it known that I, HANKLES HEABERLIN, formerly of Scipio, in the county of Jennings, and State of Indiana, but now of Clinton county, in the State of Illinois, have invented certain new and useful Improvements in Horse Hay-Rakes; and I do hereby declare the following to be a full, clear, and exact description of the same, reference being had to the accompanying drawings, making a part thereof, in which—

Figure 1 represents a top plan. Fig. 2 represents a longitudinal vertical section taken through the line A B of Fig. 1. Fig. 3 represents a side elevation, showing the rake as raised up when the machine is to be moved from place to place or thrown out of operation.

Similar letters, where they occur in the several figures, denote like parts in all.

The nature of my invention relates to the combination of an intermittently-revolving rake with a spring-bow, so that the amount of resistance to prevent the tripping of the rake may be regulated at will.

To enable others skilled in the art to make and use my invention, I will proceed to describe the same with reference to the drawings.

To an axle, X, supported in a pair of ordinary wheels, B, is attached a piece, D, projecting rearward, and on this piece D is arranged the driver's seat E.

To the front of the axle X is connected, by a horizontal king-bolt, D′, which may be a prolongation of the piece D, the rear end of the main frame, composed of the longitudinal pieces C C and transverse pieces F K. To allow this main frame to have lateral motion, so that the rake may adapt itself to the irregularities of the ground, springs S S—one on each of the longitudinal pieces C C—project back over the top of the axle X, which admits of such motion without allowing the frame to go too far. A second frame, composed of the side bars, 2 2, and cross-bar 3, is supported at its front end by a runner, N, the shank of which may swivel in the cross-bar 3, and the lower end of which may bend under and back, as shown at m′ in the drawings. This second frame and the main frame are hinged together by a through-rod, b, so that each may have a motion independent of the other. To the rear ends of the side bars, 2 2, are suspended two bearing-pieces, 4 4, to the lower ends of which the rake-head 5 is hinged or connected, so as to freely turn round when it is desired to have it turn. The suspending-pieces 4 4 are braced at top by two cross-pieces, m P, the latter one, P, being so arranged as to turn in said pieces 4. A lever, G, passes through said cross-piece P, and to said lever, at its front end, is connected a spring-bow, U, the rear end of said lever projecting backward, so as to be caught and managed by the driver on his seat E. Each branch of the spring-bow U has a foot or stop upon it, the one in front so placed as to be directly over one of the teeth of the rake. The rear foot, 9, is longer, and may extend over three or more teeth, as seen in Fig. 1. When these feet stand over the rake-teeth the rake cannot turn; but when it is desired to let the rake turn half around to discharge itself the lever G is raised up, which draws the foot 9 back. The rake can now turn, and as it turns over the tooth which lies under the front foot, 6, strikes against its side, forcing it aside until the tooth passes, when the foot will spring back to its place and be over said tooth. The lever G is now let down, and the rake is ready for raking another windrow.

A brace, H, is pivoted to the lever G at p, and its lower end rests against the foot 9 when the rake is in operation; but when the rakes are to be thrown out of operation, then it is first raised up and the brace H is swung back and rested upon the cross-pieces F K, and the rake will then remain in the position shown in Fig. 3.

An adjusting-rod, t, with a screw and nut, y, passes through the two branches of the spring-bow U, so that they may be adjusted to catch more or less strongly, as occasion or the character of the work may require.

Having thus fully described the nature of my invention, what I claim therein as new, and desire to secure by Letters Patent, is—

The combination of the revolving rake with the adjustable spring-bow U, so that said rake may be set to trip and be tripped with such variable motion of the foot 9 as may be desired, the whole being arranged and operating substantially in the manner and for the purpose set forth.

HANKLES HEABERLIN.

Witnesses.
　J. WILLIAMS,
　CHAS. L. JONES, Sr.